United States Patent
Okada (10) Patent No.: US 8,901,957 B2
(45) Date of Patent: Dec. 2, 2014

(54) PROCESSOR AND CONTROL METHOD FOR PROCESSOR

(71) Applicant: Fujitsu Semiconductor Limited, Yokohama-shi, Kanagawa (JP)

(72) Inventor: Kazuhiko Okada, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 14/188,157

(22) Filed: Feb. 24, 2014

(65) Prior Publication Data

US 2014/0244981 A1     Aug. 28, 2014

(30) Foreign Application Priority Data

Feb. 26, 2013   (JP) ................... 2013-036080

(51) Int. Cl.
*H03K 19/173*   (2006.01)
*G06F 9/38*     (2006.01)

(52) U.S. Cl.
CPC .................... *G06F 9/3885* (2013.01)
USPC ............................... 326/38; 326/40

(58) Field of Classification Search
USPC ..................................... 326/37–41
See application file for complete search history.

(56) References Cited

U.S. PATENT DOCUMENTS

| | | | | |
|---|---|---|---|---|
| 7,576,561 B1 * | 8/2009 | Huang | ............................. | 326/38 |
| 8,390,325 B2 * | 3/2013 | Box et al. | ........................ | 326/40 |
| 2005/0097499 A1 * | 5/2005 | Sun et al. | ......................... | 716/16 |
| 2005/0251778 A1 * | 11/2005 | Goodnow et al. | ............... | 716/17 |
| 2006/0225139 A1 | 10/2006 | Takada et al. | | |
| 2009/0158293 A1 | 6/2009 | Kajihara | | |
| 2011/0216247 A1 * | 9/2011 | Nishida | ......................... | 348/725 |
| 2011/0225415 A1 | 9/2011 | Yamada et al. | | |
| 2012/0054484 A1 | 3/2012 | Matsumoto | | |
| 2012/0326748 A1 * | 12/2012 | Kim et al. | ........................ | 326/38 |
| 2013/0027080 A1 * | 1/2013 | Sugiyama | ........................ | 326/41 |

FOREIGN PATENT DOCUMENTS

| | | |
|---|---|---|
| JP | 2001-068993 A | 3/2001 |
| JP | 2006-287675 A | 10/2006 |
| JP | 2011-186981 A | 9/2011 |
| JP | 2012-049669 A | 3/2012 |
| WO | WO 2007/029421 A1 | 3/2007 |

\* cited by examiner

*Primary Examiner* — Don Le
(74) *Attorney, Agent, or Firm* — Arent Fox LLP (57) ABSTRACT

A processor includes a programmable logic circuit provided with a plurality of processing units. The programmable logic circuit is capable of reconfiguring a first logic circuit corresponding to first circuit configuration information according to a first process and a second logic circuit corresponding to second circuit configuration information according to a second process. Each of the first and second logic circuits includes an information holding unit. A first control circuit stores the second circuit configuration information in the information holding unit of the first logic circuit and generates an execution control signal for executing the first process. A second control circuit obtains the second circuit configuration information from the information holding unit of the first logic circuit in response to completion of the first process and controls the programmable logic circuit so as to reconfigure the second logic circuit corresponding to the second circuit configuration information.

6 Claims, 9 Drawing Sheets

PROCESSOR AND CONTROL METHOD FOR PROCESSOR

CROSS-REFERENCE TO RELATED APPLICATIONS

This application is based upon and claims the benefit of priority from prior Japanese Patent Application No. 2013-036080, filed on Feb. 26, 2013, the entire contents of which are incorporated herein by reference.

FIELD

This disclosure relates to a processor and a control method for a processor.

BACKGROUND

Japanese Laid-Open Patent Publication No. 2001-68993 describes an example of a semiconductor device including a programmable logic circuit. The logic circuit includes a plurality of calculation units and couples the calculation units in accordance with configuration information supplied from a control circuit (e.g., CPU) provided in the semiconductor device. When a logic structure corresponding to the configuration information is configured in the logic circuit, the logic circuit outputs a completion flag. The control circuit responds to the completion flag and instructs the logic circuit to perform calculation. Then, the logic circuit performs the processing based on the instruction and outputs a completion flag upon completion of the processing. In response to the completion flag, the control circuit sets the subsequent configuration information in the logic circuit. In such a manner, the subsequent configuration information is set every time the logic circuit completes the processing.

The control circuit sets configuration information in response to a completion flag indicating the completion of processing in the logic circuit. Thus, when the programmable logic circuit performs a plurality of processes, the subsequent configuration information is not set in each logic circuit until all of the processes are completed. The delay in setting the configuration information in each logic circuit may lead to an increase in processing time.

SUMMARY

One aspect of this disclosure is a processor. The processor includes a programmable logic circuit that includes a plurality of processing units and is configured to selectively use the processing units to reconfigure a logic circuit. The programmable logic circuit is capable of performing a first process, followed by a second process which relates to the first process. The programmable logic circuit is further capable of reconfiguring a first logic circuit, which corresponds to first circuit configuration information according to the first process, and a second logic circuit, which corresponds to second circuit configuration information according to the second process, each of the first and second logic circuits including an information holding unit. The processor further includes a first control circuit that is configured to generate an execution control signal for executing the first process. The first control circuit is further configured to store the second circuit configuration information in the information holding unit of the first logic circuit. The processor further includes a second control circuit that is configured to obtain the second circuit configuration information from the information holding unit of the first logic circuit in response to completion of the first process and control the programmable logic circuit so as to reconfigure the second logic circuit corresponding to the second circuit configuration information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The embodiment, together with objects and advantages thereof, may best be understood by reference to the following description of the presently preferred embodiments together with the accompanying drawings in which.

DESCRIPTION OF THE EMBODIMENTS

Figure 1:
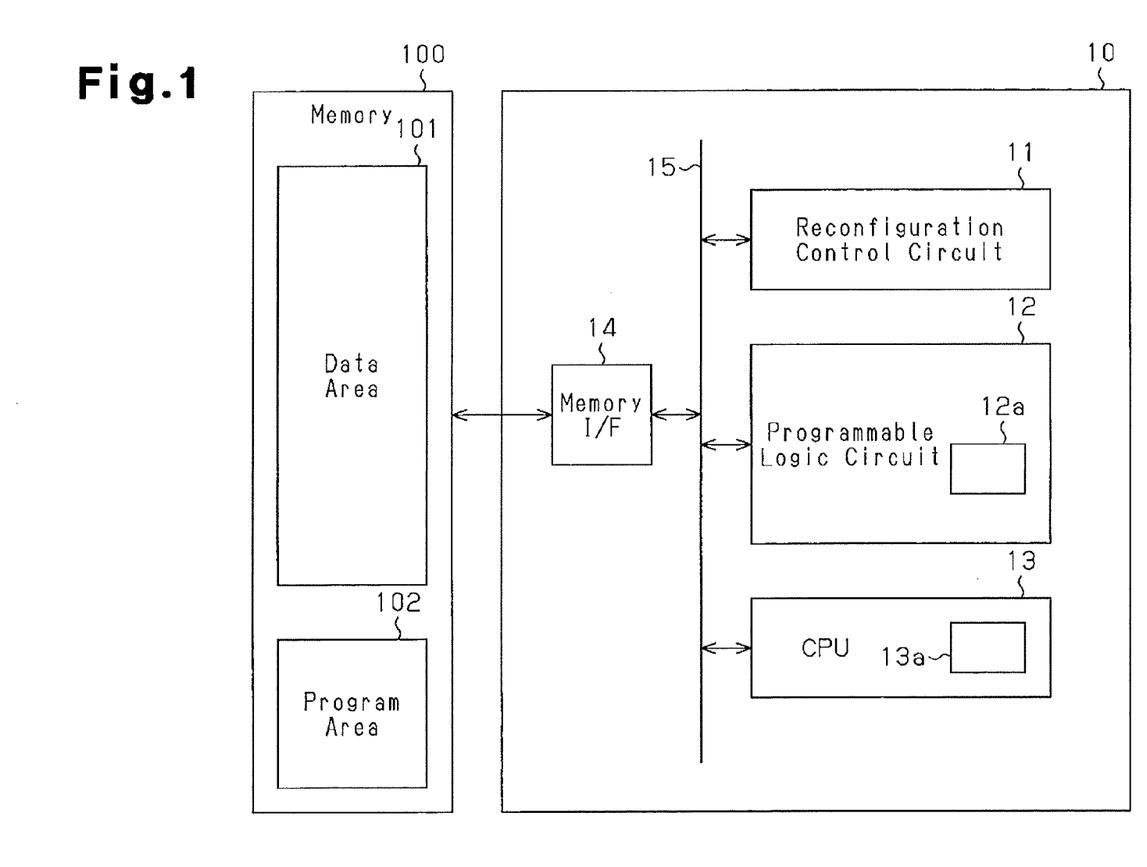
FIG. 1 is a schematic block diagram illustrating a semiconductor device and a memory.

Referring to the accompanying drawings, one embodiment will now be described below. As illustrated in FIG. 1, a processor 10 includes a reconfiguration control circuit 11, a programmable logic circuit 12, a central processing unit (hereinafter, CPU) 13, and a memory interface (a memory I/F in FIG. 1) 14, which are coupled by a bus 15 so as to communicate with one another.

The memory interface 14 is coupled to a memory 100. The memory 100 is, for example, a dynamic random access memory (DRAM). The reconfiguration control circuit 11, the programmable logic circuit 12, and the CPU 13 access the memory 100 via the bus 15 and the memory interface 14.

The CPU 13 includes a memory 13a. The memory 13a is a nonvolatile memory and stores program data performed by the CPU 13. The CPU 13 stores reconfiguration information corresponding to a process to be performed by the programmable logic circuit 12 in the memory 100 and the programmable logic circuit 12. The CPU 13 is one example of a first control circuit.

The reconfiguration control circuit 11 controls reconfiguration of the programmable logic circuit 12. The reconfiguration control circuit 11 may read reconfiguration information from the memory 100 and set the reconfiguration information in the programmable logic circuit 12. Further, the reconfiguration control circuit 11 may read reconfiguration information from the programmable logic circuit 12 and set the reconfiguration information in the programmable logic circuit 12. The reconfiguration control circuit 11 is one example of a second control circuit.

The programmable logic circuit 12 configures a logic circuit according to the reconfiguration information. The programmable logic circuit 12 is capable of configuring a plurality of logic circuits. Further, the programmable logic circuit 12 is capable of reconfiguring, during operation of one logic circuit, a plurality of other logic circuits. The logic circuits may include a calculation circuit. The programmable logic circuit 12 includes an information holding unit 12a that holds the reconfiguration information. Although not illustrated in FIG. 1, the programmable logic circuit 12 includes a plurality of processing units. The programmable logic circuit 12 configures a logic circuit by coupling some of the processing units in accordance with the reconfiguration information.

The reconfiguration information includes circuit configuration information and an operation parameter. For example, the circuit configuration information includes unit information, which indicates processing units used to configure a logic circuit, and coupling information, which indicates how the processing units, as well as the processing units and an external circuit, are coupled. The operation parameter includes an initial value and set information that are provided for the logic circuit. The set information includes, for example, a value indicating configuration of data (e.g., the number of bits) used for a process performed by each processing unit, the amount of data generated in each processing unit, and the like.

The CPU 13 sets the circuit configuration information in the program area 102 of the memory 100 and in the information holding unit 12a of the programmable logic circuit 12. Further, the CPU 13 sets the operation parameter used in the programmable logic circuit 12 in the program area 102 of the memory 100.

The reconfiguration control circuit 11 reads the circuit configuration information and the operation parameter from the program area 102 of the memory 100 in accordance with a command provided by the CPU 13. Then, the control circuit 11 sets the circuit configuration information and the operation parameter in the programmable logic circuit 12. The programmable logic circuit 12 configures a logic circuit corresponding to the circuit configuration information. The configured logic circuit processes data read from the data area 101 of the memory 100 (i.e., read data) based on the operation parameter and stores the processed data (i.e., write data) in the data area 101. When the processing completes, the logic circuit (programmable processing circuit 12) outputs a process completion flag.

In response to the process completion flag output from the programmable logic circuit 12, the reconfiguration control circuit 11 reads the circuit configuration information from the information holding unit 12a of the programmable logic circuit 12 and also reads the operation parameter from the program area 102 of the memory 100. Then, the reconfiguration control circuit 11 sets the circuit configuration information and the operation parameter in the programmable logic circuit 12. The programmable logic circuit 12 configures a logic circuit corresponding to the circuit configuration information. Based on the operation parameter, the configured logic circuit processes data (i.e., read data) read from the data area 101 of the memory 100 and stores the processed data (write data) into the data area 101.

Figure 2:
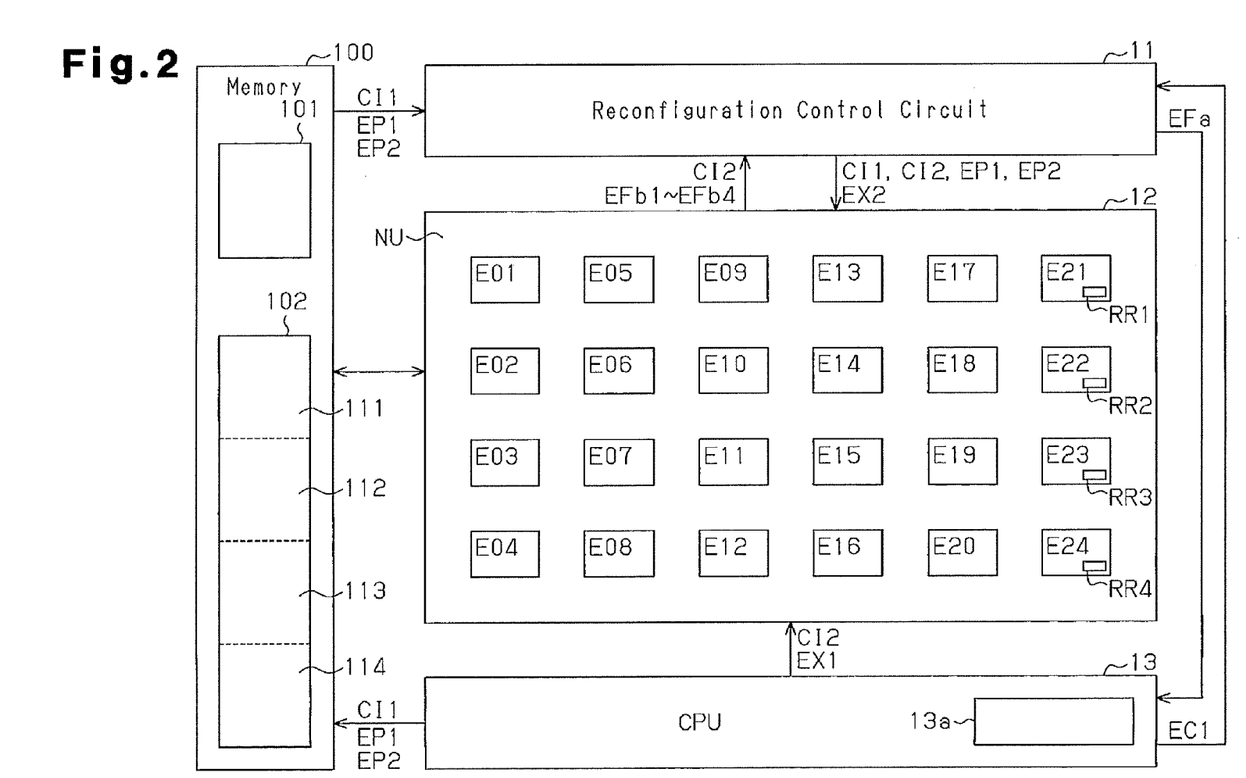
FIG. 2 is a schematic block diagram illustrating an operation of the semiconductor device and the memory.

FIG. 2 illustrates an example of the programmable logic circuit 12, as well as transmission and reception of various signals among the reconfiguration control circuit 11, the programmable logic circuit 12, the CPU 13, and the memory 100. In FIG. 2, the memory interface 14 and the bus 15 illustrated in FIG. 1 are omitted.

The programmable logic circuit 12 includes a plurality of (twenty four in FIG. 2) processing units E01 to E24 and a coupling unit NU. The processing units E01 to E20 are, for example, calculation units. The processing units E21 to E24 are, for example, output interface units. In the following description, the processing units E01 to E20 may be referred to as "calculation units E01 to E20", and the processing units E21 to E24 may be referred to as "output interface units E21 to E24".

Figure 5:
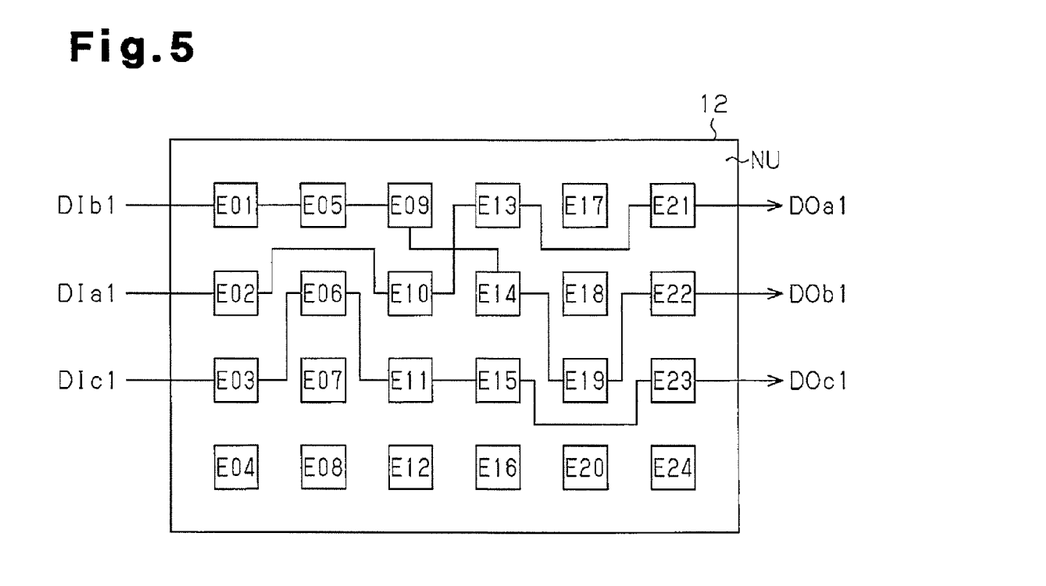
FIGS. 5 to 7 are schematic diagrams illustrating examples of reconfiguration in the programmable logic circuit.

The coupling unit NU couples some of the processing units in accordance with the circuit configuration information. Further, according to the circuit configuration information, the coupling unit NU couples some of the processing units to the bus 15 illustrated in FIG. 1. For example, as illustrated in FIG. 5, the coupling unit NU couples the processing units E01, E05, E09, E14, E19, and E22 in accordance with first circuit configuration information. In addition, the coupling unit NU couples the processing units E01 and E22 to the bus 15 in accordance with first circuit configuration information.

Further, for example, in accordance with second circuit configuration information, the coupling unit NU couples the processing units E02, E10, E13, and E21 and also couples the processing units E02 and E21 to the bus 15. Further, for example, in accordance with third circuit configuration information, the coupling unit NU couples the processing units E03, E06, E11, E15, and E23 and also couples the processing units E03 and E23 to the bus 15.

The processing unit E21 includes an information holding unit RR1. Similarly, the processing units E22 to E24 include information holding units RR2 to RR4, respectively. Each of the information holding units RR1 to RR4 is an example of the information holding unit 12a illustrated in FIG. 1.

In order to output data from the programmable logic circuit 12, each logic circuit reconfigured in the programmable logic circuit 12 includes at least one output interface unit and, in the present embodiment, at least one of the processing units E21 to E24.

The program area 102 of the memory 100 includes memory areas 111 to 114 corresponding to the processing units E21 to E24 that include the information holding units RR1 to RR4, respectively. The CPU 13 stores circuit configuration information CI1 for the first process performed in the programmable logic circuit 12 in memory areas 111 to 114. Further, the CPU 13 stores operation parameters EP1 and EP2 for processes performed by the respective logic circuits including the processing units E21 to E24 in the memory areas 111 to 114.

Further, the CPU 13 stores circuit configuration information CI2 for the subsequent process performed by the respective logic circuits including the processing units E21 to E24 in the information holding units RR1 to RR4 of the processing units E21 to E24.

The CPU 13 supplies the reconfiguration control circuit 11 with a reconfiguration control signal EC1. In response to the reconfiguration control signal EC1, the reconfiguration control circuit 11 performs a reconfiguration process for performing the first process in the programmable logic circuit 12. In the reconfiguration process, the reconfiguration control circuit 11 reads the circuit configuration information CI1 from each of the memory areas 111 to 114 and supplies the programmable logic circuit 12 with the circuit configuration information CI1. The programmable logic circuit 12 reconfigures each logic circuit in accordance with the corresponding circuit configuration information CI1.

Next, the reconfiguration control circuit 11 reads the operation parameter EP1 for the first process from each of the memory areas 111 to 114 and supplies the programmable logic circuit 12 with the operation parameter EP1. Then, the programmable logic circuit 12 sets the corresponding operation parameter EP1 into each of the processing units E21 to E24.

Upon completing the reconfiguration process to the programmable logic circuit 12, the reconfiguration control circuit 11 outputs a completion flag EFa. In response to the completion flag EFa from the reconfiguration control circuit 11, the CPU 13 supplies the programmable logic circuit 12 with an execution control signal EX1.

In response to the execution control signal EX1, the programmable logic circuit 12 activates each logic circuit configured. Each logic circuit reads data from the data area 101 of the memory 100 in accordance with the corresponding operation parameter EP1 and performs a given process (for example, calculation process) based on the read data. Then, each of the processing units E21 to E24 in the respective logic circuits stores the processed data in the memory 100 in accordance with the corresponding operation parameter EP1.

The processing units E21 to E24 output completion flags EFb1 to EFb4 when processes in the respective logic circuits are completed. By receiving the completion flags EFb1 to EFb4, the reconfiguration control circuit 11 determines that the respective logic circuits have completed their respective processes. When the respective logic circuits complete the processes, the reconfiguration control circuit 11 reads the circuit configuration information CI2 for the subsequent process from the information holding units RR1 to RR4 of the processing units E21 to E24. Further, the reconfiguration control circuit 11 reads the operation parameter EP2 for the subsequent process from each of the memory areas 111 to 114. Then, the reconfiguration control circuit 11 supplies the programmable logic circuit 12 with the circuit configuration information CI2 read from each of the information holding units RR1 to RR4 and the operation parameter EP2 read from each of the memory areas 111 to 114. Then, the programmable logic circuit 12 reconfigures each logic circuit in accordance with the corresponding circuit configuration information CI2 and sets the corresponding operation parameter EP2 in each of the processing units E21 to E24.

Then, the reconfiguration control circuit 11 supplies the programmable logic circuit 12 with an execution control signal EX2. In response to the execution control signal EX2, the programmable logic circuit 12 activates each logic circuit configured. Each logic circuit reads data from the data area 101 of the memory 100 in accordance with the corresponding operation parameter EP2 and performs a given process (for example, calculation process) based on the read data. Then, each of the processing units E21 to E24 in the respective logic circuits stores the processed data in the memory 100 in accordance with the corresponding operation parameter EP2.

As described above, the completion flags EFb1 to EFb4 are output from the processing units E21 to E24 when the respective logic circuits complete their respective processes. In response to the completion flags EFb1 to EFb4, the reconfiguration control circuit 11 reads the circuit configuration information CI2 for the subsequent process from the processing units E21 to E24. Further, in response to the completion flags EFb1 to Efb4, the reconfiguration control circuit 11 reads the operation parameter EP2 from the memory areas 111 to 114 respectively corresponding to the processing units E21 to E24. Then, the reconfiguration control circuit 11 supplies the programmable logic circuit 12 with the circuit configuration information CI2 and the operation parameter EP2 and reconfigures the programmable logical circuit 12.

Accordingly, even when one of the logic circuits reconfigured in the programmable logic circuit 12 is performing the process, the reconfiguration control circuit 11 reconfigures a new logic circuit and allows the new logic circuit to perform the subsequent process. Therefore, in comparison to the case where a new logic circuit for the subsequent process is reconfigured after all logic circuits reconfigured in the programmable logic circuit 12 complete their respective processes, the processing units in the programmable logic circuit 12 may be used effectively. This may reduce waiting time in processes performed successively and shorten the total processing time in the programmable logic circuit 12.

Figure 3:
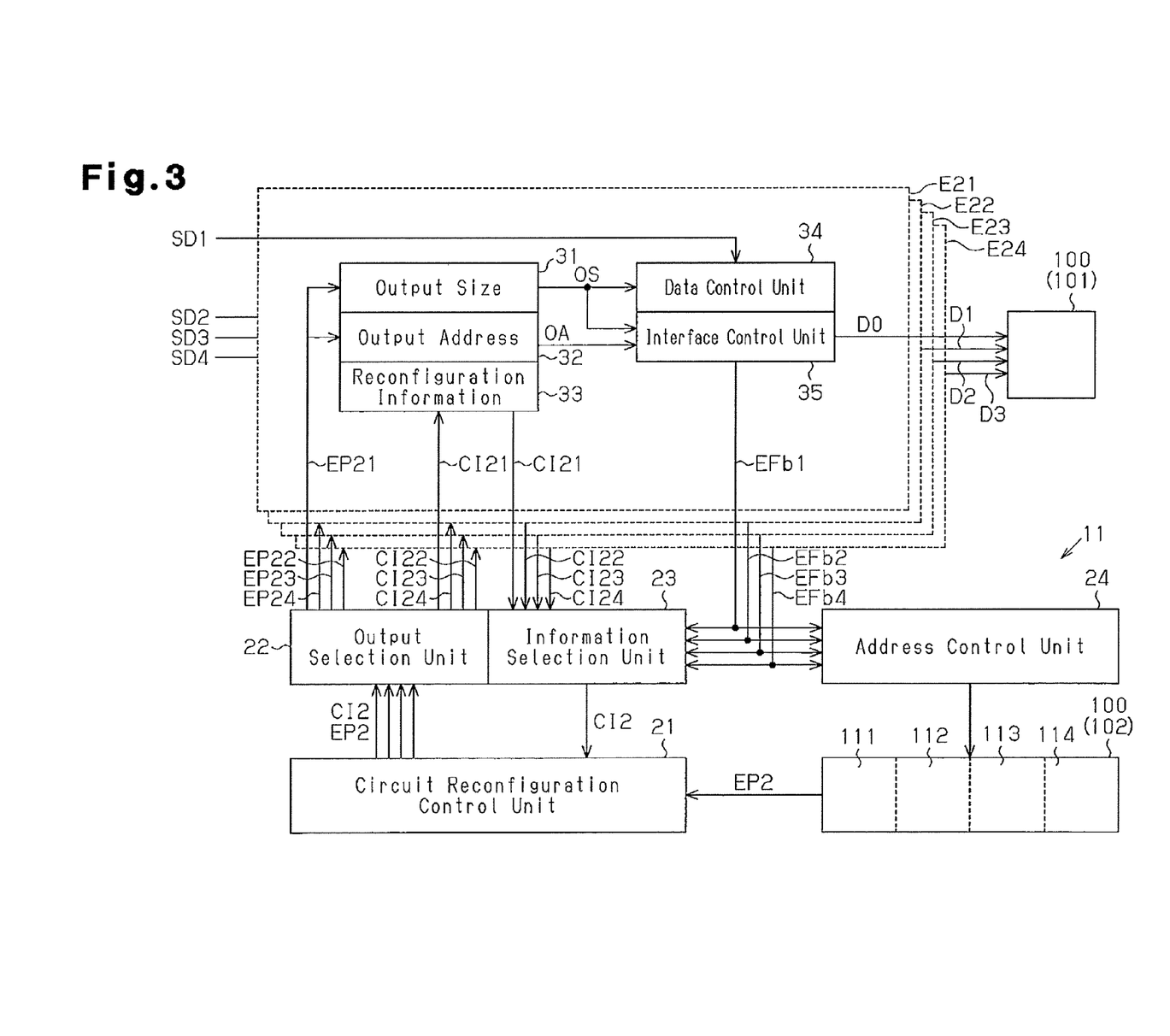
FIG. 3 is a schematic block circuit diagram illustrating a reconfiguration control circuit and a plurality of output interface units.

FIG. 3 illustrates an example of the reconfiguration control circuit 11 and the processing units E21 to E24 (output interface units E21 to E24). The output interface units E21 to E24 are identical to one another. Therefore, the structure of the output interface unit E21 will now be explained, and parts of the explanations of the output interface units E22 to E24 are omitted. Further, in FIG. 3, components included in the output interface units E22 to E24, as well as the memory interface 14 and bus 15 illustrated in FIG. 1, are omitted.

The output interface unit E21 includes first to third registers 31 to 33, a data control unit 34, and an interface control unit 35. The first and second registers 31 and 32 store the operation parameters of the output interface unit E21. For example, the operation parameter stored in the first register 31 indicates an output size OS, and the operation parameter stored in the second register 32 indicates an output address OA. The output size OS corresponds to the amount of data transferred to the memory 100 in each transfer process. The output address OA specifies an area where data is written. The third register 33 stores the circuit configuration information CI2. Each of the first to third registers 31 to 33 is an example of the information holding unit RR1 illustrated in FIG. 2. Although not illustrated, each of the output interface units E22 to E24 also includes first to third registers 31 to 33. Each of the registers 31 to 33 of the output interface unit E22 is an example of the information holding unit RR2. Each of the registers 31 to 33 of the output interface unit E23 is an example of the information holding unit RR3. Each of the registers 31 to 33 of the output interface unit E24 is an example of the information holding unit RR4.

The data control unit 34 is supplied with data SD1 output from a processing unit coupled to the output interface unit E21. The data control unit 34 monitors the amount of output data SD1 and supplies the interface control unit 35 with a control signal indicating arrival of the initial data. When the amount of output data SD1 reaches the output size OS, the data control unit 34 supplies the interface control unit 35 with a control signal indicating completion of the process.

Based on the control signal supplied from the data control unit 34, the output size OS stored in the first register 31, and the output address OA stored in the second register 32, the interface control unit 35 transfers output data D0 held in the data control unit 34 to the memory 100. Consequently, the output data D0 is stored in the data area 101 of the memory 100 specified by the output address OA.

Upon transfer of the output data D0 to the memory 100, the interface control unit 35 outputs a completion flag EFb1. Similarly, upon transfer of output data D1 to D3 according to the output data SD2 to SD4 to the memory 100, the respective interface control units of the output interface units E22 to E24 output completion flags EFb2 to EFb4, respectively.

The reconfiguration circuit 11 includes a circuit reconfiguration control unit 21, an output selection unit 22, an information selection unit 23, and an address control unit 24. Based on the completion flags EFb1 to EFb4, the address control unit 24 determines addresses for accessing the memory areas 111 to 114 corresponding to the output interface units E21 to E24. The output interface unit used in each of processes performed in the programmable logic circuit 12 and the order of the processes are determined beforehand. For example, a pointer is shifted according to the process performed in the programmable logic circuit 12 and an address is determined based on the pointer and the completion flags EFb1 to EFb4. Then, the address control unit 24 supplies the determined address to the memory 100. Based on the address supplied by the address control unit 24, the memory 100 reads the operation parameter EP2 from the corresponding one of the memory areas 111 to 114.

The information selection unit 23 reads circuit configuration information from the respective third registers 33 of the output interface units E21 to E24 based on the completion flags EFb1 to EFb4. For example, the information selection unit 23 reads circuit configuration information CI21 from the third register 33 of the output interface unit E21 based on the completion flag EFb1. Similarly, based on the completion flags EFb2 to EFb4, the information selection unit 23 reads circuit configuration informations CI22 to CI24, respectively from the respective third registers 33 of the output interface units E22 to E24. Then, the information selection unit 23 supplies the circuit reconfiguration control unit 21 with the circuit configuration information. In FIG. 3, "CI2" indicates one of the circuit configuration information CI21 to CI24. Similarly, "EP2" indicates one of the operation parameters EP21 to EP 24.

The circuit configuration control unit 21 supplies the output selection unit 22 with the circuit configuration information CI2 and the operation parameter EP2. The output selection unit 22 supplies the programmable logic circuit 12 with the circuit configuration information CI2. The programmable logic circuit 12 configures a logic circuit corresponding to the circuit configuration information CI2. Further, the output selection unit 22 sets the operation parameter EP2 in a processing unit of a logic circuit to be configured next based on the circuit configuration information CI2.

For example, the logic circuit to be configured next based on the circuit configuration information CI2 includes the output interface unit E21. In this case, the output selection unit 22 sets an operation parameter EP21 in each of the first and second registers 31 and 32 of the output interface unit E21. Similarly, in the case where the logic circuit to be configured next includes the output interface unit E22, the output selection unit 22 sets an operation parameter EP22 in each of the first and second registers 31 and 32 of the output interface unit E22. Similarly, in the case where the logic circuit to be configured next includes the output interface unit E23 or E24, the output selection unit 22 sets an operation parameter EP23 in each of the first and second registers 31 and 32 of the output interface unit E23.

Thus, based on the circuit configuration information CI2 and the operation parameter EP2, the reconfiguration control circuit 11 controls reconfiguration of the logic circuit that performs the subsequence process. The circuit configuration information CI2 includes information (unit numbers) for specifying processing units included in the logic circuit to be reconfigured. The reconfiguration control circuit 11 supplies the programmable logic circuit 12 with the circuit configuration information CI2. Further, the reconfiguration control circuit 11 sets the operation parameter EP2 in the processing unit included in the logic circuit reconfigured in the programmable logic circuit 12.

Figure 8:
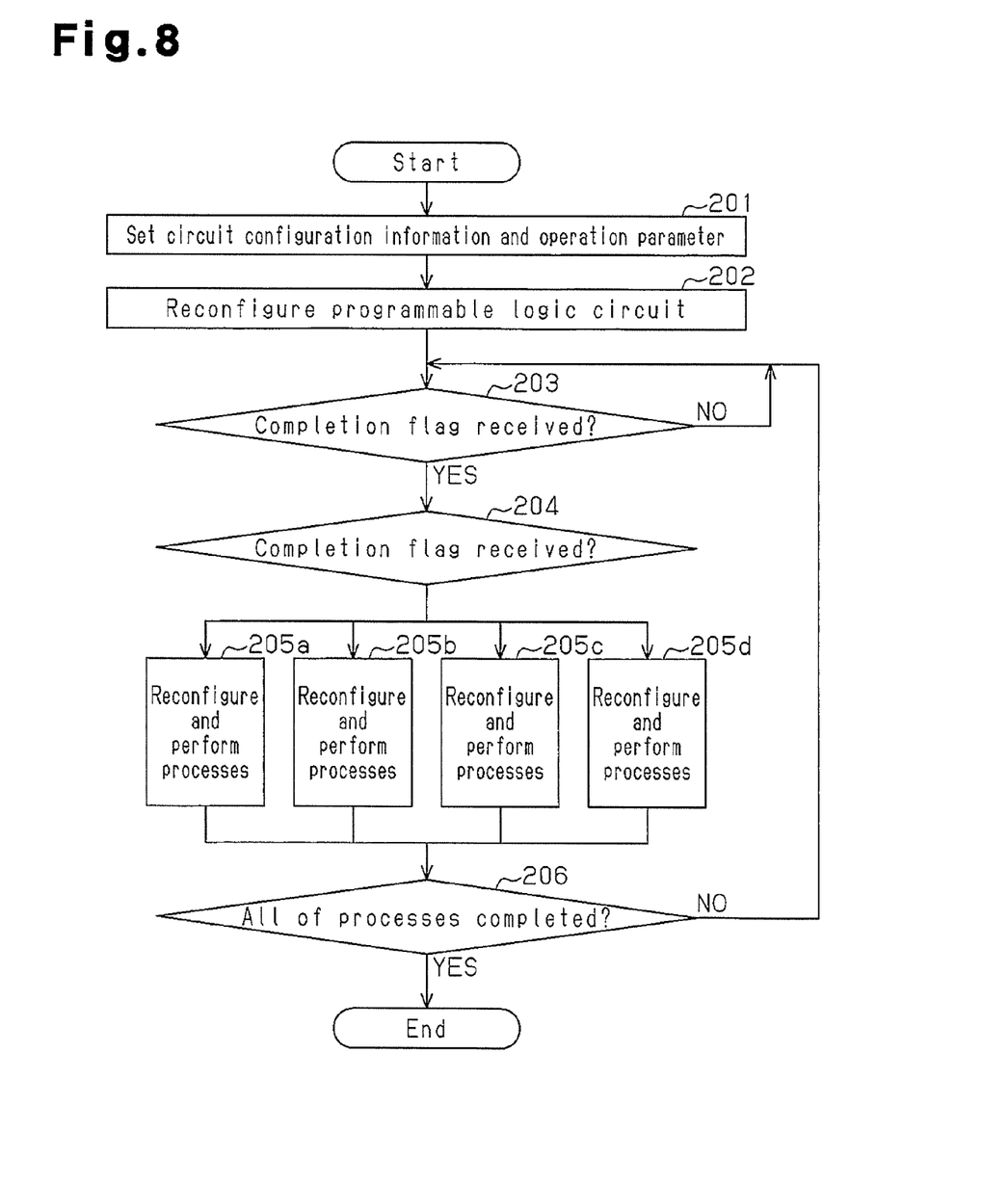
FIGS. 8 to 10 are schematic flowcharts of a reconfiguration process.

Next, the flow of reconfiguration processing in the programmable logic circuit 12 will now be described. As illustrated in FIG. 8, in step 201, the CPU 13 sets the circuit configuration information and the operation parameter in the programmable logic circuit 12 and the memory 100. Then, the CPU 13 outputs the reconfiguration control signal EC1.

Next, in step 202, the reconfiguration control circuit 11 reconfigures the programmable logic circuit 12 in response to the reconfiguration control signal EC1 and outputs the completion flag EFa. In response to the completion flag EFa, the CPU 13 outputs the execution control signal EX1 to activate the programmable logic circuit 12.

Next, in step 203, the reconfiguration control circuit 11 determines whether or not to receive the completion flags EFb1 to EFb4. When none of the completion flags EFb1 to EFb4 is output, the reconfiguration control circuit 11 repeats step 203. When any of the completion flags EFb1 to EFb4 is output, the reconfiguration control circuit 11 executes step 204.

In step 204, the reconfiguration control circuit 11 identifies the unit number of the output interface unit that has output the completion flag and executes steps 205a to 205d in accordance with the identified unit number. For example, when the output interface unit E21 has output the completion flag EFb1, the reconfiguration control circuit 11 executes step 205a. Similarly, when the output interface units E22 to E24 has output the completion flags EFb2 to EFb4, the reconfiguration control circuit 11 executes steps 205b to 205d respectively.

In step 205a, the reconfiguration control circuit 11 reconfigures the programmable logic circuit 12 based on the circuit configuration information CI21 read from the register 33 of the processing unit E21 (output interface unit E21) and the operation parameter EP21 read from the memory area 111 in accordance with the completion flag EFb1. Then, the reconfiguration control circuit 11 activates the logic circuit reconfigured in the programmable logic circuit 12.

In step 205b, the reconfiguration control circuit 11 reconfigures the programmable logic circuit 12 based on the circuit configuration information CI22 read from the register 33 of the processing unit E22 (output interface unit E22) and the operation parameter EP22 read from the memory area 112 in accordance with the completion flag EFb2. Then, the reconfiguration control circuit 11 activates the logic circuit reconfigured in the programmable logic circuit 12.

In step 205c, the reconfiguration control circuit 11 reconfigures the programmable logic circuit 12 based on the circuit configuration information CI23 read from the register 33 of the processing unit E23 (output interface unit E23) and the operation parameter EP23 read from the memory area 113 in accordance with the completion flag EFb3. Then, the reconfiguration control circuit 11 activates the logic circuit reconfigured in the programmable logic circuit 12.

In step 205d, the reconfiguration control circuit 11 reconfigures the programmable logic circuit 12 based on the circuit configuration information CI24 read from the register 33 of the processing unit E24 (output interface unit E24) and the operation parameter EP24 read from the memory area 114 in accordance with the completion flag EFb4. Then, the reconfiguration control circuit 11 activates the logic circuit reconfigured in the programmable logic circuit 12.

Next, in step 206, the reconfiguration control circuit 11 determines whether or not all the logic circuits reconfigured have completed their respective processes, that is, whether or not the logic circuits have output the respective completion flags. When there are any logic circuits that have not completed their processes, the reconfiguration control circuit 11 executes step 203 again. When all the logic circuits complete their processes, the reconfiguration process in FIG. 8 ends.

Figure 4A:
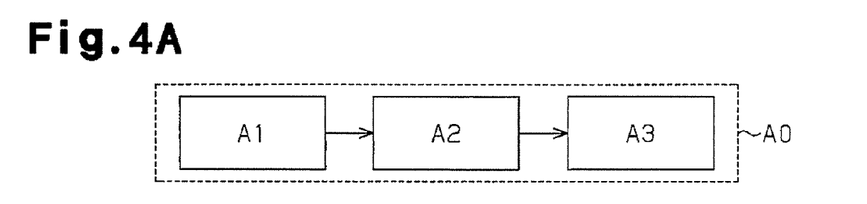
FIGS. 4A to 4C are schematic diagrams illustrating examples of processing in a programmable processing circuit.

Next, an example of the processing performed in the programmable logic circuit 12 will now be described. As illustrated in FIG. 4A, a process A0 includes a process A1, a process A2, and a process A3. For example, in the process A1, the programmable logic circuit 12 reads data from the data area 101 of the memory 100 illustrated in FIG. 1, processes the data, and stores the processed data into the data area 101. In the process A2, the programmable logic circuit 12 reads the data stored in the data area 101 by the process A1, processes the data, and stores the processed data into the data area 101. In the process A3, the programmable logic circuit 12 reads the data stored in the data area 101 by the process A2, processes the data, and stores the processed data into the data area 101. Thus, in the process A0, the process A1 is first processed, the process A2 is next processed, and the process A3 is lastly processed.

Figure 4B:
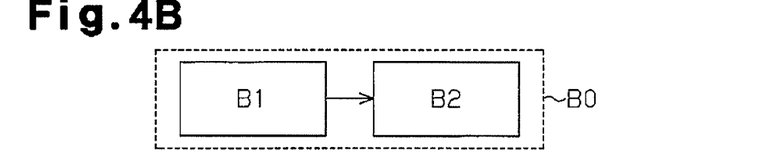

As illustrated in FIG. 4B, a process B0 includes a process B1 and a process B2. For example, in the process B1, the programmable logic circuit 12 reads data from the data area 101 of the memory 100 illustrated in FIG. 1, processes the data, and stores the processed data into the data area 101. In the process B2, the programmable logic circuit 12 reads the data stored in the data area 101 by the process B1, processes the data, and stores the processed data into the data area 101. Thus, in the process B0, the process B1 is first processed, and then, the process B2 is processed.

Figure 4C:
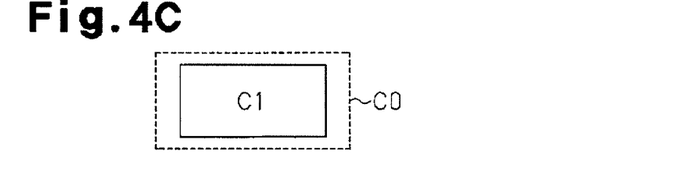

As illustrated in FIG. 4C, a process C0 includes a process C1. For example, in the process C1, the programmable logic circuit 12 reads data from the data area 101 of the memory 100 illustrated in FIG. 1, processes the data, and stores the processed data into the data area 101.

The process A0 (processes A1 to A3), the process B0 (processes B1 and B2), and the process C0 (process C1) are each calculation process. In the following description, the process A0 (processes A1 to A3), the process B0 (processes B1 and B2), and the process C0 (process C1) may be referred to as calculation A0 (A1 to A3), calculation B0 (B1, B2), and calculation C0 (C1), respectively.

Next, an example of logic circuits configured in the programmable logic circuit 12 in accordance with the reconfiguration information will now be described. Here, logic circuits that perform the processes illustrated in FIGS. 4A to 4C will now be described.

As illustrated in FIG. 5, the logic circuit that performs the process A1 illustrated in FIG. 4A is configured from, for example, the processing units E02, E10, E13, and E21. The reconfiguration information (circuit configuration information) corresponding to the process A1 includes the unit numbers of the processing units E02, E10, E13, and E21 and the coupling information for coupling these processing units. The processing unit E02 is supplied with data DIa1 used in the process A1. The processing unit E21 outputs data DOa1 as the result of the process A1.

As illustrated in FIG. 5, the logic circuit that performs the process B1 illustrated in FIG. 4B is configured from, for examples, the processing units E01, E05, E09, E14, E19, and E22. The reconfiguration information (circuit configuration information) corresponding to the process B1 includes the unit numbers of the processing units E01, E05, E09, E14, E19, and E22 and the coupling information for coupling these processing units. The processing unit E01 is supplied with data DIb1 used in the process B1. The processing unit E22 outputs data DOb1 as the result of the process B1.

As illustrated in FIG. 5, the logic circuit that performs the process C1 illustrated in FIG. 4C is configured from, for examples, the processing units E03, E06, E11, E15, and E23. The reconfiguration information (circuit configuration information) corresponding to the process C1 includes the unit numbers of the processing units E03, E06, E11, E15, and E23 and the coupling information for coupling these processing units. The processing unit E03 is supplied with data DIc1 used in the process C1. The processing unit E23 outputs data DOc1 as the result of the process C1.

Figure 6:
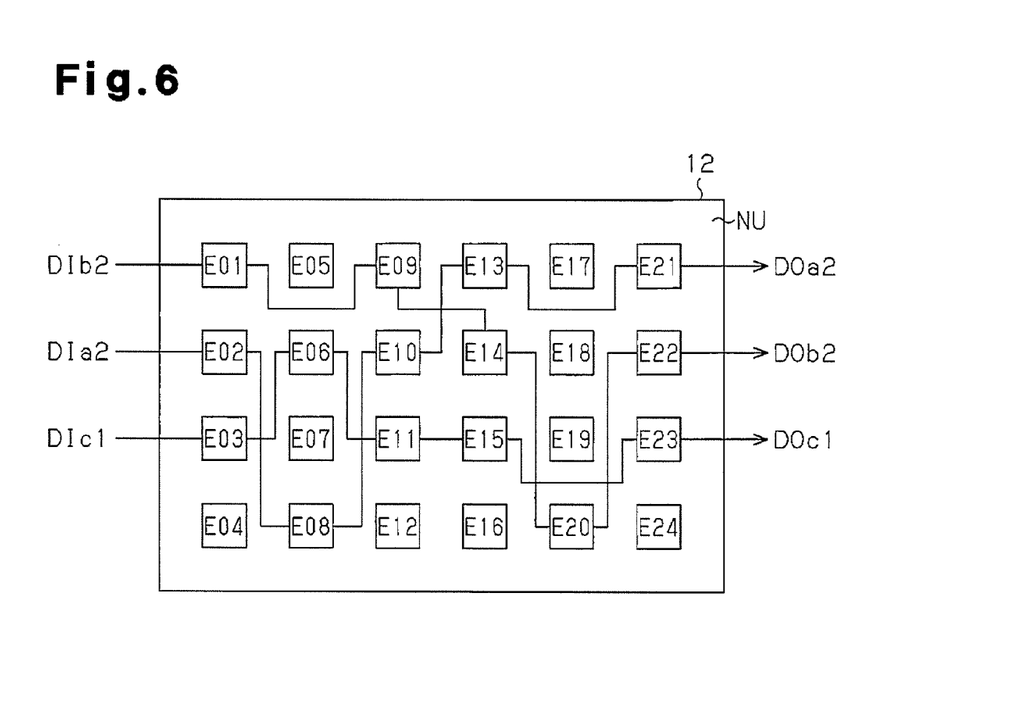

As illustrated in FIG. 6, the logic circuit that performs the process A2 illustrated in FIG. 4A is configured from, for example, the processing units E02, E08, E10, E13, and E21. The reconfiguration information (circuit configuration information) corresponding to the process A2 includes the unit numbers of the processing units E02, E08, E10, E13, and E21 and the coupling information for coupling these processing units. The processing unit E02 is supplied with data DIa2 used in the process A2. The processing unit E21 outputs data DOa2 as the result of the process A2.

As illustrated in FIG. 6, the logic circuit that performs the process B2 illustrated in FIG. 4B is configured from, for examples, the processing units E01, E09, E14, E20, and E22. The reconfiguration information (circuit configuration information) corresponding to the process B2 includes the unit numbers of the processing units E01, E09, E14, E20, and E22 and the coupling information for coupling these processing units. The processing unit E01 is supplied with data DIb2 used in the process B2. The processing unit E22 outputs data DOb2 as the result of the process B2.

Figure 7:
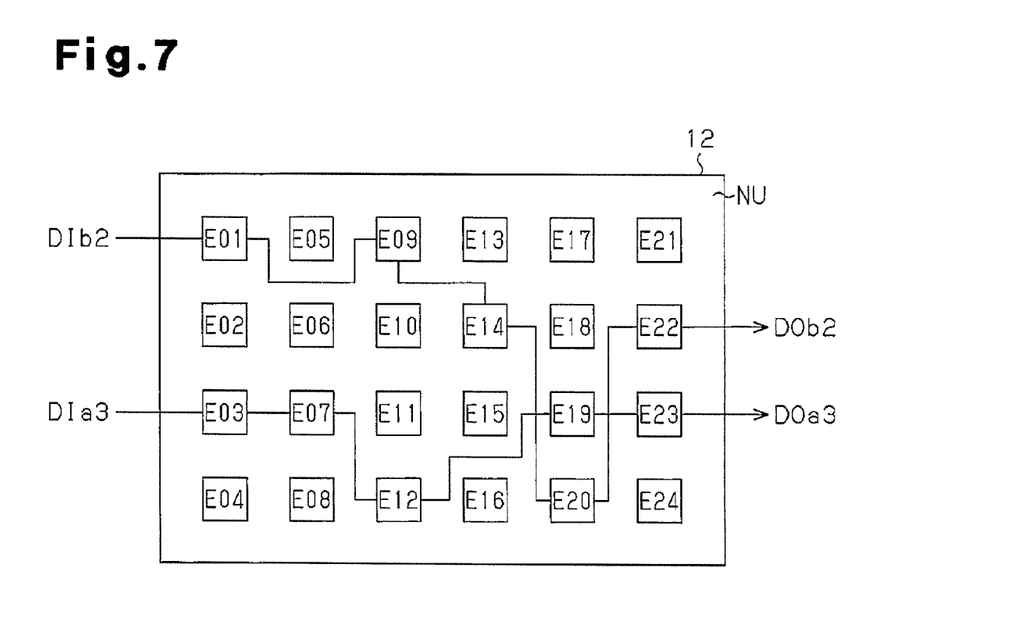

As illustrated in FIG. 7, the logic circuit that performs the process A3 illustrated in FIG. 4A is configured from, for examples, the processing units E03, E07, E12, E19, and E23. The reconfiguration information (circuit configuration information) corresponding to the process A3 includes the unit numbers of the processing units E03, E07, E12, E19, and E23 and the coupling information for coupling these processing units. The processing unit E03 is supplied with data DIa3 used in the process A3. The processing unit E23 outputs data DOa3 as the result of the process A3.

Next, an example of the processing performed in step 201 (setting of the circuit configuration information and the operation parameters) illustrated in FIG. 8 will now be described. Step 201 includes steps 221 to 223 illustrated in FIG. 9.

Figure 9:
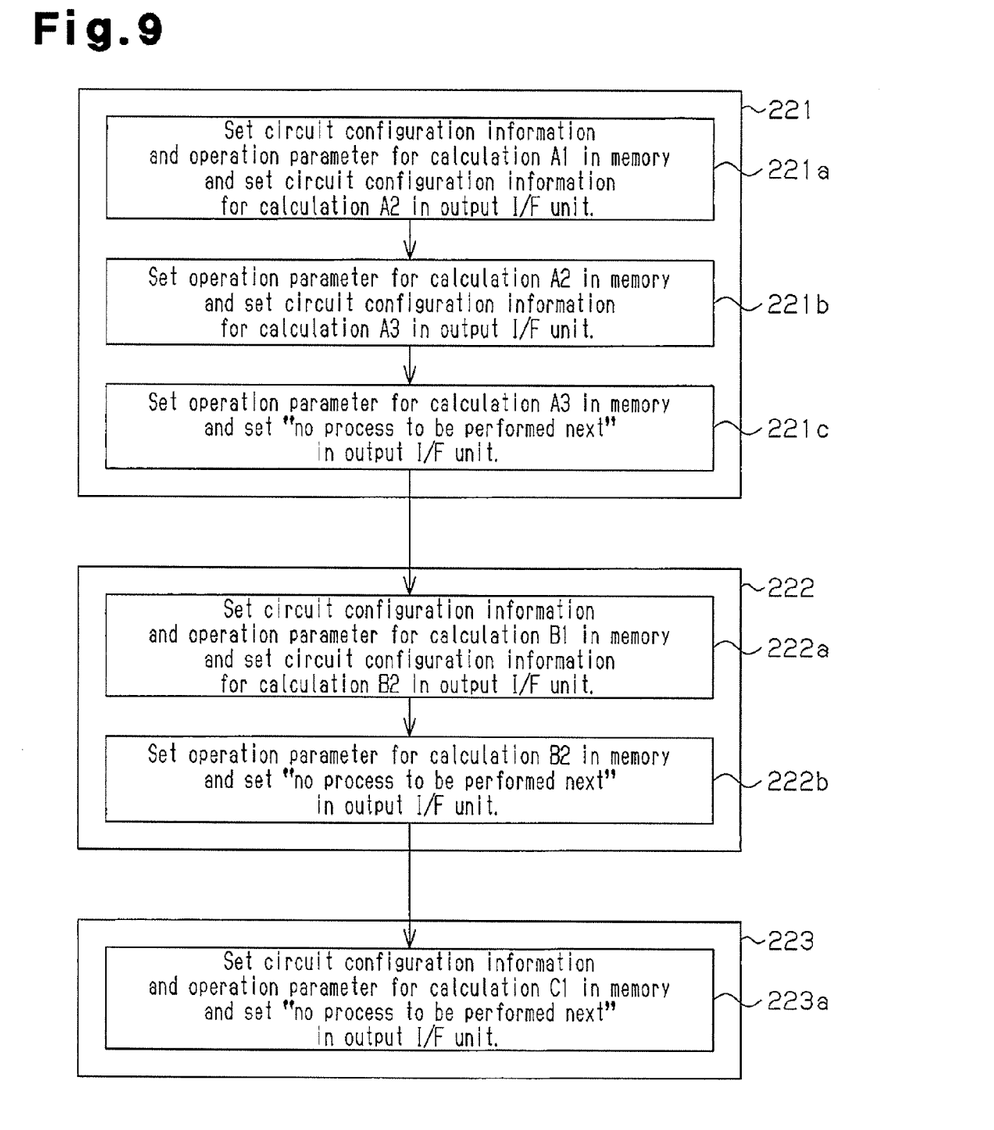

In step 221, the CPU 13 sets the reconfiguration information corresponding to the process A0 illustrated in FIG. 4A. First in step 221a, the CPU 13 sets the circuit configuration information and the operation parameter for the calculation A1 in the memory 100. The CPU 13 sets the circuit configuration information for the calculation A2 in the register 33 of the output interface unit E21 used in the logic circuit that performs the calculation A1. Next, in step 221b, the CPU 13 sets the operation parameter for the calculation A2 in the memory 100. Further, the CPU 13 sets the circuit configuration information for the calculation A3 in the register 33 of the output interface unit E21 used in the logic circuit that performs the calculation A1. Next, in step 221c, the CPU 13 sets the operation parameter for the calculation A3 in the memory 100. Further, the CPU 13 sets "No process to be performed next" as the circuit configuration information in the register 33 of the output interface unit E23 used in the logic circuit that performs the calculation A3.

Next, in step 222, the CPU 13 sets the reconfiguration information corresponding to the process B0 illustrated in FIG. 4B. First in step 222a, the CPU 13 sets the circuit configuration information and the operation parameter for the calculation B1 in the memory 100. Further, the CPU 13 sets the circuit configuration information for the calculation B2 in the register 33 of the output interface unit E22 used in the logic circuit that performs the calculation B1. Next, in step 222b, the CPU 13 sets the operation parameter for the calculation B2 in the memory 100. Further, the CPU 13 sets "No process to be performed next" as the circuit configuration information in the register 33 of the output interface unit E22 used in the logic circuit that performs the calculation B2.

Next, in step 223, the CPU 13 sets the reconfiguration information corresponding to the process C0 illustrated in FIG. 4C. That is, in step 223a, the CPU 13 sets the circuit configuration information and the operation parameter for the calculation C1 in the memory 100. Further, the CPU 13 sets "No process to be performed next" as the circuit configuration information in the register 33 of the output interface unit E23 used in the logic circuit that performs the calculation C1.

Next, examples of the processes performed in steps 205a to 205d illustrated in FIG. 8 will now be described. The processes in steps 205a to 205d are identical to one another. Here, the process in step 205a will now be explained.

Figure 10:
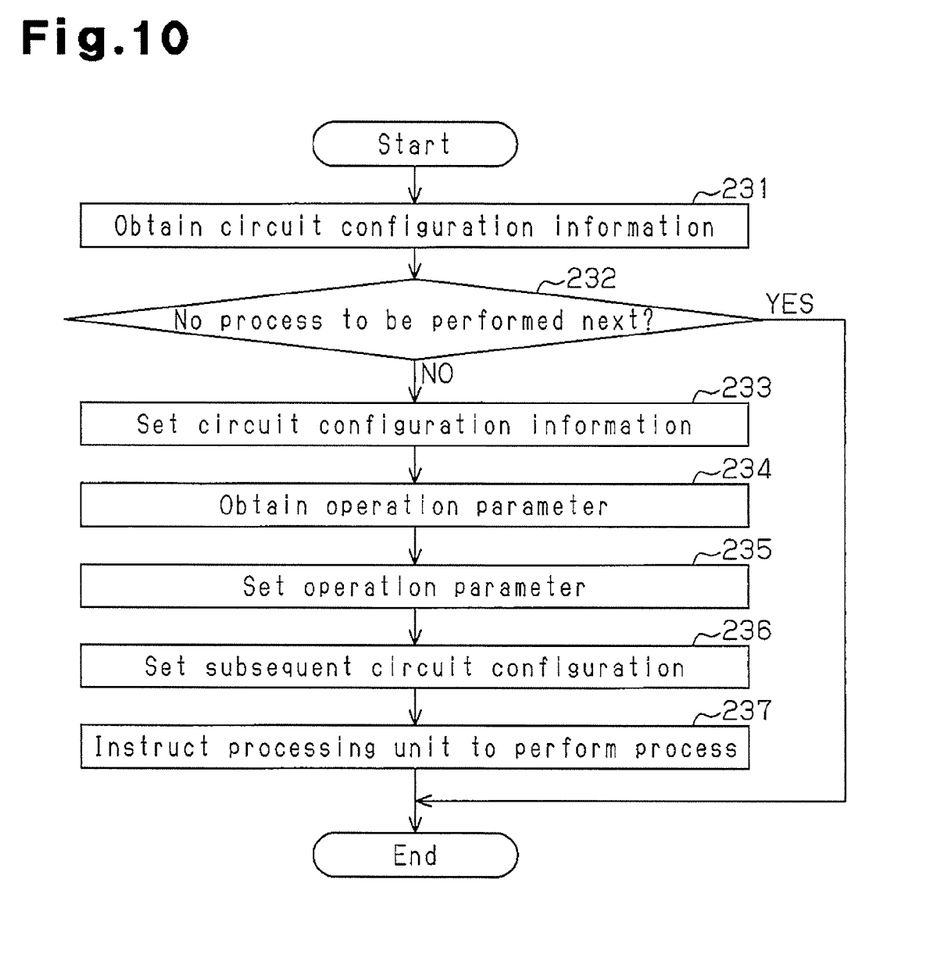

Step 205a illustrated in FIG. 8 includes steps 231 to 237 illustrated in FIG. 10. In step 231, the reconfiguration control circuit 11 obtains, from the register 33 of the output interface unit E21, the circuit configuration information for a logic circuit to be configured next. In step 232, the reconfiguration control circuit 11 determines whether or not the circuit configuration information indicates "No process to be performed next". When the circuit configuration information indicates "No process to be performed next", the process in step 205a ends. When the circuit configuration information does not indicate "No process to be performed next" (i.e., the subsequent process is present), the reconfiguration control circuit 11 proceeds to step 233.

In step 233, the reconfiguration control circuit 11 sets the circuit configuration information in the programmable logic circuit 12. Thus, a new logic circuit is configured.

Next, in step 234, the reconfiguration control circuit 11 obtains the operation parameter from the memory area 111 illustrated in FIG. 3. Then, in step 235, the reconfiguration control circuit 11 sets the operation parameter in each of the registers 31 and 32 of the output interface unit of the logic circuit configured in step 233.

Next, in step 236, the reconfiguration control circuit 11 stores the circuit configuration information for a logic circuit to be configured next in the register 33 of the output interface unit of the logic circuit configured in step 233.

For example, the processes performed by the programmable logic circuit 12 are performed by a plurality of logic circuits which are configured in sequence through the reconfiguration processes performed an n (1≤n) times. In this case, for example in step 233, the logic circuit is configured through the m-th (1≤m<n) reconfiguration process. In step 236, the circuit configuration information used in and after the (m+1)th reconfiguration process is stored in the register 33 of the logic circuit (output interface unit) configured through the m-th reconfiguration process.

Next, in step 237, the reconfiguration control circuit 11 instructs the logic circuit (processing units) configured in step 233 to perform processes.

Next, the operation of the processor 10 will now be described.

Figure 11A:
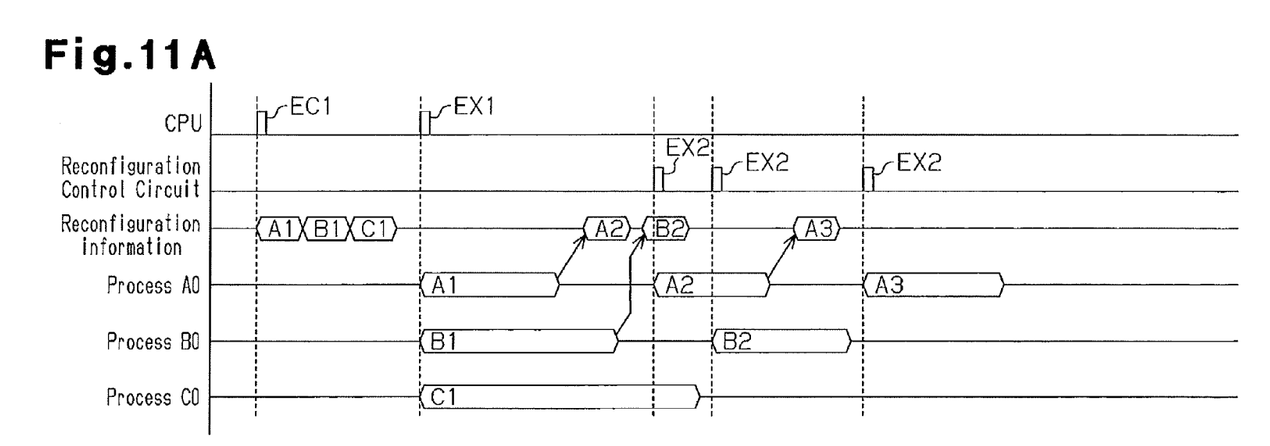
FIG. 11A is a timing chart illustrating the operation of the semiconductor device.

As illustrated in FIG. 11A, the CPU 13 outputs the reconfiguration control signal EC1. In response to the reconfiguration control signal EC1, the reconfiguration control circuit 11 sets the reconfiguration information for the processes A1, B1, and C1 in the programmable logic circuit 12. The programmable logic circuit 12 configures a logic circuit corresponding to the reconfiguration information according to the process A1, a logic circuit corresponding to the reconfiguration information according to the process B1, and a logic circuit corresponding to the reconfiguration information according to the process C1. Subsequently, the CPU 13 outputs the execution control signal EX1. The three logic circuits configured in the programmable logic circuit 12 perform the respective processes, A1, B1, and C1.

First, when the process A1 completes, the reconfiguration control circuit 11 sets the reconfiguration information according to the subsequent process A2 in the programmable logic circuit 12. The programmable logic circuit 12 newly configures a logic circuit corresponding to the reconfiguration information according to the process A2. Then, the reconfiguration control circuit 11 outputs the execution control signal EX2. The logic circuit newly configured in the programmable logic circuit 12 performs the process A2 in response to the execution control signal EX2.

Here, when the process A1 completes, the processes B1 and C1 are being performed. That is, even when the processes B1 and C1 are being performed, the logic circuit for the subsequent process A2 is configured and the process A2 is initiated.

Next, when the process B1 completes, the reconfiguration control circuit 11 sets the reconfiguration information according to the subsequent process B2 in the programmable logic circuit 12. The programmable logic circuit 12 newly configures a logic circuit corresponding to the configuration information according to the process B2. Then, the reconfiguration control circuit 11 outputs the execution control signal EX2. The logic control circuit newly configured in the programmable logic circuit 12 performs the process B2 in response to the execution control signal EX2. Here, when the process B1 completes, the process C1 is being performed. Thus, even when the process C1 is being performed, the logic circuit for the subsequent process B2 is configured. Further, even when the logic circuit for the process B2 is being configured, the process A2 is initiated.

Next, when the process C1 completes, the reconfiguration control circuit 11 determines that there is no process to be processed subsequently to the process C1, and completes processes relating to the process C0.

Next, when the process A2 completes, the reconfiguration control circuit 11 sets the reconfiguration information according to the subsequent process A3 in the programmable logic circuit 12. The programmable logic circuit 12 newly configures a logic circuit corresponding to the reconfiguration information according to the process A3. Then, the reconfiguration control circuit 11 outputs the execution control signal EX2. The logic circuit newly configured in the programmable logic circuit 12 performs the process A3 in response to the execution control signal EX2.

Next, a comparative example will now be described. In the comparative example, a CPU manages setting of the reconfiguration information relating to a plurality of processes. In the following description, components identical to those in the embodiment described above are labelled with the same names and symbols.

Figure 11B:
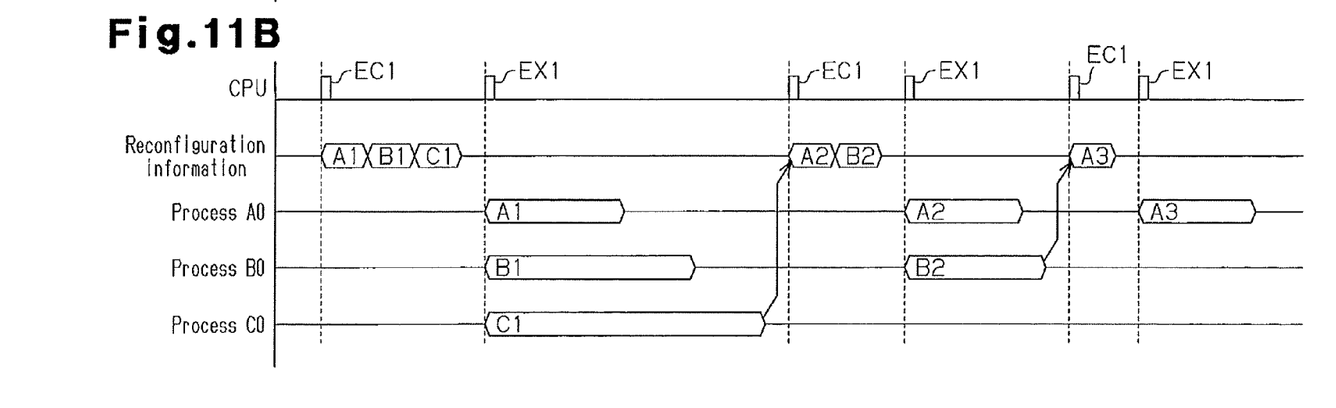
FIG. 11B is a timing chart illustrating an operation of a comparative example.

As illustrated in FIG. 11B, a CPU 13 outputs a reconfiguration control signal EC1. In response to the reconfiguration control signal EC1, a reconfiguration control circuit 11 sets the reconfiguration information according to processes A1, B1, and C1 in the programmable logic circuit 12. The programmable logic circuit 12 configures a logic circuit corresponding to the reconfiguration information according to the process A1, a logic circuit corresponding to the reconfiguration information according to the process B1, and a logic circuit corresponding to the reconfiguration information according to the process C1. Subsequently, the CPU 13 outputs an execution control signal EX1. The three logic circuits configured in the programmable logic circuit 12 perform their respective processes, A1, B1, and C1.

First, the process A1 completes, then the process B1 completes, and lastly the process C1 completes. When the process C1 completes, all the processes in the programmable logic circuit 12 complete. Then, the CPU 13 outputs the reconfiguration control signal EC1, and the reconfiguration control circuit 11 sets the reconfiguration information according to the subsequent processes A2 and B2 in the programmable logic circuit 12. The programmable logic circuit 12 configures a logic circuit corresponding to the reconfiguration information according to the process A2, and a logic circuit corresponding to the reconfiguration information according to the process B2. Then, the CPU 13 outputs the execution control signal EX1. The two logic circuits configured in the programmable logic circuit 12 perform the respective processes A2 and B2.

Thereafter, the process A2 completes first. Then, the process B2 completes. When the process B2 completes, the CPU 13 outputs the reconfiguration control single EC1, and the reconfiguration control circuit 11 sets reconfiguration information according to the subsequent process A3 in the programmable logic circuit 12. The programmable logic circuit 12 configures a logic circuit corresponding to the reconfiguration information according to the process A3. Then, the CPU 13 outputs the execution control signal EX1. The logic circuit configured in the programmable logic circuit 12 performs the process A3. Next, when the process A3 completes, all the processes are completed.

As described above, in the present embodiment illustrated in FIG. 11A, the times required to perform the process A0 (processes A1 to A3) and the process B0 (processes B1 and B2) are shortened in comparison to those in the comparative example illustrated in FIG. 11B. Accordingly, in the processor 10 according to the present embodiment, processing time may be shortened than that in the comparative example.

The present embodiment has the advantages described below.

(1) The programmable logic circuit 12 includes a plurality of processing units E01 to E24. Each of the processing units E01 to E20 is, for example, a calculation unit. Each of the processing units E21 to E24 is an output interface unit. The processing units E21 to E24 include information holding units RR1 to RR4, respectively.

The CPU 13 stores the circuit configuration information CI1 according to the first process and the operation parameters EP1 and EP2 for performing the first process in the program area 102 of the memory 100. Further, the CPU 13 stores the circuit configuration information CI2 according to the second process and the circuit configuration information according to the subsequent processes in the respective information holding units RR1 to RR4 of the processing units E21 to E24 used for the first process. Upon receiving the completion flags EFb1 to EFb4 from the programmable logic circuit 12, the reconfiguration control circuit 11 determines that the processing units E21 to E24 have completed their processes. When the processing units E21 to E24 complete their processes, the reconfiguration control circuit 11 obtains the circuit configuration information CI2 from the information holding units RR1 to RR4 of the processing units E21 to E24. Then, the reconfiguration control circuit 11 sets the circuit configuration information CI2 in the programmable logic circuit 12.

According to this structure, for example, when the process A1 completes, the reconfiguration control circuit 11 reads the circuit configuration information CI2 according to the subsequent process A2 even while the processes B1 and C1 being performed, and controls the programmable logic circuit 12 so as to reconfigure a logic circuit corresponding to the circuit configuration information CI2. Thus, without waiting for completion of the processes B1 and C1, the subsequent process A2 may be initiated. Accordingly, processing time may be shortened.

(2) The processing units E21 to E24 among the processing units E01 to E24 serve as the output interface units E21 to E24 which output processed data. The output interface units E21 to E24 include the information holding units RR1 to RR4, respectively, for holding the circuit configuration information. In this structure, the circuit configuration information is stored in the information holding unit (output interface unit) of a logic circuit reconfigured in the programmable logic circuit 12. Accordingly, upon completion of the first process in the logic circuit, the reconfiguration control circuit 11 may easily obtain the circuit configuration information for the subsequent process.

It should be apparent to those skilled in the art that the above embodiment may be embodied in many other specific forms without departing from the scope of the invention. Particularly, it should be understood that the above embodiment may be embodied in the following forms.

In the embodiment described above, data used in the processes A0 to C0 performed in the programmable logic circuit 12 are read from the memory 100, but they may be supplied from an external device.

In the embodiment described above, the programmable logic circuit 12 stores processed data in the memory 100, but may store them in an external device.

In the embodiment described above, the programmable logic circuit 12 may repeat the same process more than once. For example, in FIG. 11A, after the process A1 has been performed more than once, the process A2 may be performed.

In the example illustrated in FIG. 11A, the programmable logic circuit 12 first performs the processes A1, B1, and C1. However, the timing with which processes are initiated may be changed if required. For example, where three processes A, B, and C are performed, the process A may be performed first, and followed by the processes A and B in response to the completion of the process A. Further, in response to the completion of the processes A and B, the processes A to C may be performed. In this way, a pipeline process may be achieved.

In the embodiment described above, the information holding units (registers 33) for holding the circuit configuration information are included in the output interface units E21 to E24, but may be included in other processing units E01 to E20.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments of the present invention have been described in detail, it should be understood that various changes, substitutions, and alterations could be made hereto without departing from the spirit and scope of the invention.

The invention claimed is:

1. A processor comprising:
a programmable logic circuit that includes a plurality of processing units and is configured to selectively use the processing units to reconfigure a logic circuit,
wherein the programmable logic circuit is capable of performing a first process, followed by a second process which relates to the first process, and
wherein the programmable logic circuit is capable of reconfiguring a first logic circuit, which corresponds to first circuit configuration information according to the first process, and a second logic circuit, which corresponds to second circuit configuration information according to the second process, each of the first and second logic circuits including an information holding unit;
a first control circuit that is configured to generate an execution control signal for executing the first process, the first control circuit is configured to store the second circuit configuration information in the information holding unit of the first logic circuit; and
a second control circuit that is configured to obtain the second circuit configuration information from the information holding unit of the first logic circuit in response to completion of the first process and control the programmable logic circuit so as to reconfigure the second logic circuit corresponding to the second circuit configuration information.

2. The processor according to claim 1, wherein
the first control circuit is configured to store third circuit configuration information according to a third process, which relates to the second process and is performed after the second process, in the information holding unit of the first logic circuit, and
the second control circuit is configured to obtain the third circuit configuration information from the information holding unit of the first logic circuit, store the third circuit configuration information in the information holding unit of the second logic circuit, and generate an execution control signal for executing the second process.

3. The processor according to claim 1, wherein
the first control circuit is configured to store the first circuit configuration information in a memory and supply the second control circuit with a reconfiguration control signal, and
the second control circuit is configured to obtain the first circuit configuration information from the memory in response to the reconfiguration control signal and control the programmable logic circuit so as to reconfigure the first logic circuit corresponding to the first circuit configuration information.

4. The processor according to claim 2, wherein
the first control circuit is configured to store an operation parameter for each of a plurality of logic circuits to be reconfigured in a memory area defined in the memory in correspondence with the processing unit having the information holding unit in each logic circuit, and
the second control circuit is configured to obtain the operation parameter for the second logic circuit from the corresponding memory area and store the operation parameter for the second logic circuit in the information holding unit of the second logic circuit.

5. A processor, comprising:
a programmable logic circuit that includes a plurality of processing units and is configured to selectively use the processing units to reconfigure a logic circuit,
wherein the programmable logic circuit is capable of performing a first calculation process and a second calculation process in parallel, the first calculation process including a first process and a second process that are performed in succession, and the second calculation process including a third process, and
wherein the programmable logic circuit is capable of reconfiguring a first logic circuit, which corresponds to first circuit configuration information according to the first process, a second logic circuit, which corresponds to second circuit configuration information according to the second process, and a third logic circuit, which corresponds to third circuit configuration information according to the third process, each of the first to third logic circuits including an information holding unit;
a first control circuit that is configured to generate an execution control signal for executing the first process and the third process, wherein the first control circuit is configured to store the first circuit configuration information and the third circuit configuration information in a memory and store the second circuit configuration information in the information holding unit of the first logic circuit; and
a second control circuit that is configured to read the first circuit configuration information and the third circuit configuration information from the memory in response to the execution control signal and control the programmable logic circuit so as to reconfigure the first and third logic circuits respectively corresponding to the first and third circuit configuration information, wherein the second control circuit is configured to obtain the second circuit configuration information from the information holding unit of the first logic circuit in response to completion of the first process and control the programmable logic circuit so as to reconfigure the second logic circuit corresponding to the second circuit configuration information.

6. A method for controlling a processor including a programmable logic circuit, the method comprising:
reconfiguring, in the programmable logic circuit, a first logic circuit corresponding to first circuit configuration information according to a first process, the first logic circuit including an information holding unit;
storing second circuit configuration information according to a second process in the information holding unit of the first logic circuit, the second process relating to the first process and being performed after the first process;
performing the first process with the first logic circuit;
obtaining the second circuit configuration information from the information holding unit of the first logic circuit in response to completion of the first process; and
reconfiguring, in the programmable logic circuit, a second logic circuit corresponding to the second circuit configuration information.

* * * * *